Oct. 28, 1969　　　　O. P. O'BRIEN　　　　3,474,776

INTRAUTERINE MUSCLE ACTIVITY MEASURING SYSTEM

Filed Aug. 30, 1967

INVENTOR
ORLIN P. O'BRIEN
BY
Olsen and Stephenson
ATTORNEYS

United States Patent Office 3,474,776
Patented Oct. 28, 1969

3,474,776
INTRAUTERINE MUSCLE ACTIVITY MEASURING SYSTEM
Orlin Patrick O'Brien, 2068 Pauline Blvd., Ann Arbor, Mich. 48103
Filed Aug. 30, 1967, Ser. No. 664,363
Int. Cl. A61b 5/10; A61f 5/46
U.S. Cl. 128—2
4 Claims

ABSTRACT OF THE DISCLOSURE

An apparatus for observing and measuring localized muscle activity within closed human organs. The apparatus includes a cantilever-beam type transducer employing a strain sensitive electrical resistance element and the transducer is constructed so that it can be left in the human organs for prolonged periods of time and can be put into service merely by connecting two electrical leads from the resistance element to an external instrument to form an arm of a balanced bridge circuit therewith. An oscillograph can be used to read resultant voltage unbalance in the bridge circuit, thereby indicating muscle activity of the particular organ.

BACKGROUND OF THE INVENTION

The present invention relates to a device adapted to be inserted into human organs, and if desired, to be left there for prolonged periods of time for periodically observing and measuring localized muscle activity.

Studies of localized muscle activity have been made in the past, but the most complete and accurate results have not always been realized and in some instances have never been realized, because the devices used heretofore for making such studies have been suitable only for temporary insertion into the organ and then generally only to measure the pressure within the organ. Since the muscle activity will affect the pressure within the organ some significant data can be obtained by these devices. However, it has been discovered that in many instances, the mere act of inserting a device of this character into the organ will disturb the normal muscle activity for as long as two or three days, thus making it impossible to obtain accurate and meaningful data on the muscle activity during this time period. Devices used heretofore also have normally been of the type which measure pressure within an organ as distinguished from a device for measuring directly the muscle activity of the organ and since pressure may be affected by conditions other than muscle activity, the prior are devices have not been able to provide the most accurate data on muscle activity.

SUMMARY OF THE INVENTION

The present invention has overcome inadequacies of the prior art set forth above. According to a preferred form of the invention, an apparatus is provided for observing and measuring localized muscle activity within human organs, comprising an insert member having a cylindrical portion with a longitudinally extending inset or recess, a flexible cantilever beam mounted on said member at one end of the recess and extending in parallel relationship to the axis of the cylindrical portion to a position adjacent to the other end of the recess. The beam is substantially flush with the external surface of the cylindrical portion so that it will flex only in response to forces impressed thereon normal to the surface of the cylindrical portion, and a strain sensitive resistance element is bonded to the surface of the cantilever beam. Fine electrical leads extend from the electrical resistance element and are adapted to be connected to an instrument to form one arm of a balanced bridge circuit, whereby deflection of the cantilever beam will vary the resistance of the electrical resistance element and the resultant voltage unbalanced in the bridge circuit can be displayed on an oscillograph. In one form of the invention the insert cantilever beam and associated electrical resistance elements are located in an inset of a Lippes Loop. If desired, a plurality of such beam structures can be used in the separate arms of the Lippes Loop. In other instances, the cantilever beam structure can be inserted into a single elongated element of other suitable and desired shape.

It is an object of the present invention to provide an improved apparatus for observing and measuring localized muscle activity within human organs.

Other objects of this invention will appear in the following description and appended claims, reference being had to the accompanying drawing forming a part of this specification wherein like reference characters designate corresponding parts in the several views.

DESCRIPTION OF THE PREFERRED EMBODIMENTS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein for the purpose of description and not of limitation.

Figure 1:
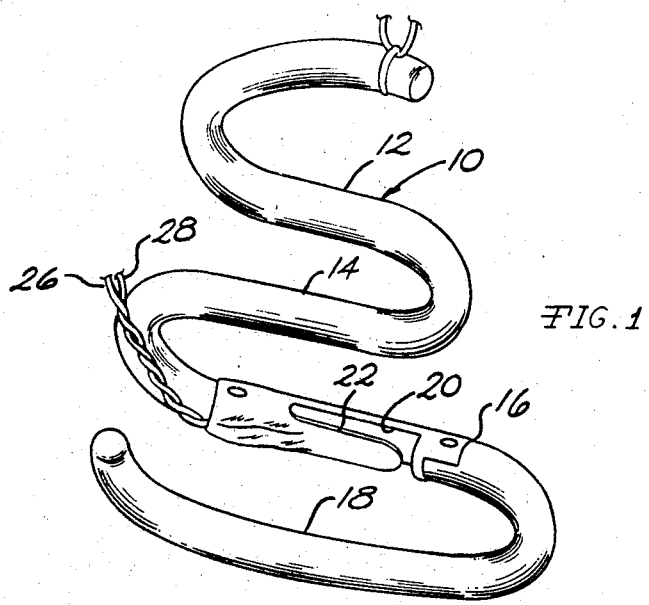
FIGURE 1 is a perspective view of one embodiment of the invention when used with a Lippes Loop.
Figure 3:
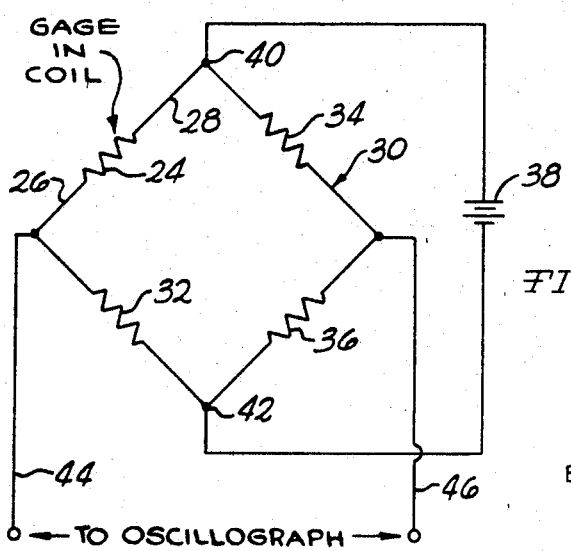
FIGURE 3 is a schematic diagram of a preferred electrical circuit which may be employed in conjunction with the embodiment of FIGURE 1 as well as with other embodiments of the invention.

Referring now to FIGURES 1 and 3, a preferred embodiment of the invention will be described. As shown in FIGURE 1, a Lippes Loop has a plurality of arms 12, 14, 16 and 18. The arm 16 has formed therein a longitudinally extending recess 20. A flexible cantilever beam 22 is suitably supported on the elongated portion or arm 16 so that the fixed end of the flexible cantilever beam is adjacent one end of the recess 20, and the other end terminates adjacent to the other end of the recess 20. The cantilever beam 22 is positioned so that it is substantially flush with a plane passing parallel to the axis of the Lippes Loop and at one surface of the Lippes Loop. Thus, the flexible cantilever beam 22 will be responsive to any forces acting perpendicular to this plane and will flex in response thereto.

The cantilever beam 22 has bonded to its surface a conventional strain sensitive electrical resistance element 24 which is in series with a pair of fine electrical leads 26 and 28. In the conventional manner, flexing of the cantilever beam 22 will have the effect of varying the resistance of the strain sensitive element 24.

In normal use, the strain sensitive resistance element 24 and its leads 26 and 28 constitute one arm of a balance electrical bridge circuit 30. This circuit is of a conventional arrangement, and for a brief description thereof attention is directed to FIGURE 3. It is to be understood that any suitable circuit may be used in place of circuit 30 which is capable of functioning in a suitable instrument for recording or indicating the flexing of the cantilever beam 22. In the circuit 30, resistances 32, 34 and 36 are provided forming the four bridge arms. The resistances are selected so that a balanced bridge is provided when the resistance element 24 is in an unstressed state. Any suitable source of electric power is provided at 38 and is connected to the bridge circuit at 40 and 42. By virtue of this arrangement, potential variations across the resistance element 24 will vary in accordance with the changes of the resistance therein, thereby causing a change in the potential applied to an oscillograph connected to the bridge 30 by means of electrical leads 44 and 46.

From the foregoing description, it will be understood that the device shown and described in FIGURES 1 and 3 will function to measure force variations that occur normal to the surface of the flexible cantilever beam 22, and other forces acting on the Lippes Loop 10 will have no effect on signals transmitted to the oscillograph.

The embodiment of the invention shown in FIGURE 1 in intended to be inserted into the uterus of a human being, and may be left there for periods up to six months. The two fine lead wires 26 and 28 may be left in the vagina, and may subsequently, from time to time, be connected to appropriate or suitable instruments such as the bridge circuit 30 for furnishing information relative to the muscle activity of the patient. When the instrument is inserted in the manner suggested, the beam 22 is in close proximity to the endometrial surface. When the muscle segment above the beam contracts, it presses down, deflecting the beam which increases the resistance of the gage 24. The resultant voltage unbalance in the bridge circuit 30 is then displayed on the oscillograph. Due to the physical construction of the device, that is the beam inset, the device is sensitive only to muscle deformation directly above the beam. Also, by virtue of the fact that the device is constructed so that it may be left in a human organ for a long period of time, the desired tests may be carried out at desired time periods, and the results thus obtained will not be rendered inaccurate due to disturbances created by inserting the instrument in place.

Figure 2:
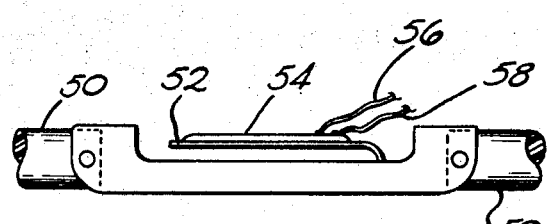
FIGURE 2 is a fragmentary side elevational view of a slightly modified form of the present invention.

It will be understood that the present invention is not limited to the use of only one cantilever beam type of insert in a Lippes Loop, but for muscle wave propagation studies, two or three such inserts can be built into separate arms of the Lippes Loop. It will be understood that the invention may be used with other insert members having shapes different from that of the Lippes Loop. Thus, the essential feature is that the cantilever beam type of insert is positioned in a recess or insert within an insert member 50 such, as is shown fragmentarily in FIGURE 2, which has a tubular cross section or the like adapted to fit into a duct or other organ of the human body. As is shown in the embodiment of FIGURE 2, a cantilever beam 52 is provided having a strain gage or strain sensitive electrical resistance element 54 positioned thereon, and again, electrical leads 56 and 58 are provided for connecting to an instrument external of the organ in which the muscle activity is to be measured.

Having thus described my invention, I claim:

1. An apparatus for observing and measuring localized muscle activity within human organs comprising an insert member having an elongated portion with a longitudinally extending recess, a flexible cantilever beam mounted on said member at one end of said recess and extending in parallel relationship to the axis of the elongated portion to a position adjacent to the other end of said recess, said beam being substantially flush with the external surface of said portion so that the beam will flex only in response to forces impressed thereon normal to said portion, a strain sensitive electrical resistance element supported on the surface of said cantilever beam, and means electrically in circuit with said resistance element responsive to resistance variations therein for indicating flexing of said beam.

2. An apparatus according to claim 1, wherein said elongated portion is a portion of a Lippes Loop.

3. An apparatus according to claim 1, wherein said resistance element is in series with two electrical leads forming one arm of a bridge circuit.

4. An apparatus according to claim 1, wherein said elongated portion has dielectric properties.

References Cited

UNITED STATES PATENTS

| | | | |
|---|---|---|---|
| 2,176,559 | 10/1939 | Meckstroth | 128—130 |
| 2,989,357 | 6/1961 | Vevvett et al. | 128—2 XR |
| 3,059,710 | 10/1962 | Pien | 73—88.5 XR |
| 3,350,944 | 11/1967 | DeMichele | 73—88.5 XR |
| 3,420,222 | 1/1969 | Noe et al. | 128—2 |

WILLIAM E. KAMM, Primary Examiner

U.S. Cl. X.R.

73—88.5; 128—130